Aug. 3, 1965     W. BORBERG     3,198,410
INTERMITTENT MOVEMENT FOR FILM TRANSPORT MECHANISM
Filed April 3, 1963
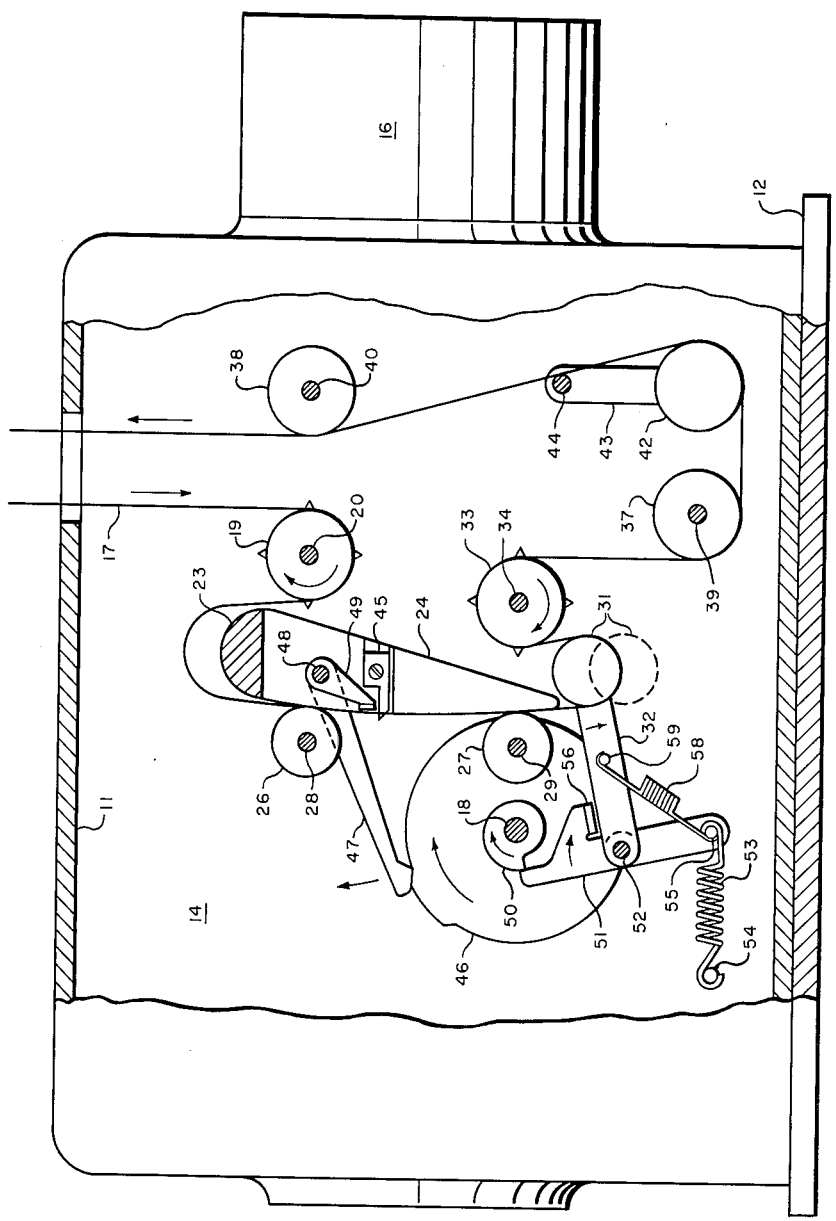
INVENTOR.
WILLY BORBERG
BY *H. S. Mackey*
ATTORNEY.

3,198,410
INTERMITTENT MOVEMENT FOR FILM
TRANSPORT MECHANISM
Willy Borberg, Briarcliff Manor, N.Y., assignor to General Precision, Inc., a corporation of Delaware
Filed Apr. 3, 1963, Ser. No. 270,434
4 Claims. (Cl. 226—56)

This invention relates to intermittent movements and more particularly to intermittent movements of the film beater type which are particularly adapted for use in motion picture projecters and cameras.

Film beater intermittents for motion picture projectors and cameras offer many advantages. They are inexpensive to manufacture, rugged, fast, and relatively trouble free, but these advantages are accompanied by a decided disadvantage. In certain forms they are subject to poor film registration. One design overcomes this by utilizing register pins which engage the sprocket holes in the film during the dwell time and in addition applies a constant tension to the film; however, during film pull-down a relatively large force must be exerted on the film to accelerate the film and rollers. Thus during the dwell period, when the register pins engage the sprocket holes the film is elongated due to film stretch and sprocket hole deformation, both of which result in poor image quality and may in addition materially shorten the useful life of the film. In severe cases the elongation and sprocket hole deformation may render the film unusable after the first use.

One object of this invention is to provide a film beater intermittent which is capable of a fast pull-down.

Another object is to provide a film beater intermittent which is capable of storing a large quantity of energy to provide a rapid film pull-down and does not subject the film to excessive tension during film dwell.

Yet another object is to provide a film beater intermittent which is rapid in operation and which will not damage the film or impair the image quality by either elongation or sprocket hole deformation.

The invention contemplates, a film beater intermittent comprising, film engaging means, means responsive to a timer for accelerating the film engaging means during a preselected time interval for advancing the film a predetermined distance, and means for exerting a substantially uniform force on the film engaging means to maintain proper film tension during all portions of the operating cycle except for the interval when the film engaging means is being accelerated by the means responsive to the timer.

The foregoing and other objects and advantages of the subject invention will become more apparent from a consideration of the drawing and specification wherein one embodiment of the invention is shown and described for illustration purposes only.

The single figure is a cross-sectional view of a camera on a plane parallel to the optical axis of the camera and normal to the bottom and top of the camera.

The camera housing 11 is mounted on a support plate 12 which may be mounted on any convenient mounting device such as a tripod or table. Only so much of the camera is shown in sectional view as is necessary to illustrate the invention. Thus the details of the lens system and the shutter are not disclosed since their operation is not critical as far as the operation of the novel intermittent is concerned.

A wall 14 extends the entire length of the camera housing and provides a support for one end of the shafts and rollers visible in the drawing. A similar wall not shown extends parallel to wall 14 and supports the other ends of the shafts and rollers visible in the drawing.

A film drive motor 16 is supported by the rear vertical wall of a camera housing 11 and supplies the motive power necessary to advance the film 17 through gearing, not visible because of wall 14, and a drive shaft 18 which is journaled in wall 14. A description of how drive shaft 18 effects film movement will be deferred for the moment.

A conventional film magazine, not shown in the drawing, is located above the housing 11 and contains supply and take-up reels for storing film 17. The film passes through openings in the top of housing 11 into the interior of the housing. The film from the supply reel passes over a sprocket drive wheel 19 which is continuously driven by a shaft 20 connected to film drive motor 16 by conventional gearing located behind wall 14.

After leaving wheel 19 the film passes over a snubber 23 which has a large radius, curved surface extending the entire width of the film to absorb the shock on the film at the end of the pull-down. Snubber 23 extends between two side plates 24, only one of which is visible in the drawing. Side plates 24 are supported by walls 14 and each has a slightly curved front surface for supporting the edges of film 17. The curvature is not enough to affect focusing of the image but sufficient to maintain the film in the proper position without buckling.

A pair of identical rollers 26 and 27 mounted on shafts 28 and 29, respectively, are located on either side of the optical axis, out of the image area, and maintain film 17 in contact with the curved front surface of side plates 24. The film after leaving the lower extremes of side plates 24 passes over a roller 31 which is mounted on a pivoted arm 32 which is part of the pull-down mechanism and will be described in greater detail later.

The film 17 after leaving roller 31 passes over a sprocket wheel 33 which is driven through a shaft 34 by motor 16 in a manner similar to wheel 19. Both wheels 19 and 33 are driven at the same speed.

After leaving sprocket wheel 33 the film 17 passes over two fixed rollers 37 and 38 mounted for rotation on shafts 39 and 40, respectively, and a tension roller 42 mounted on a spring loaded arm 43 which is pivotally mounted on a shaft 44. After leaving roller 38 it leaves the camera housing 11 and goes to the take-up reel of the magazine located above the camera housing 11.

During the film dwell time two identical register pins 45, only one of which is shown, mounted on side plates 24 engage sprocket holes on opposite sides of film 17 and prevent film movement during the exposure or dwell time. If the invention is utilized with film having only one set of sprocket holes, such as 16 mm. film, then one of the register pins must be eliminated since it would not be able to engage the film during the dwell period.

A cam 46 is driven by shaft 18 and operates a spring loaded cam follower 47 which is mounted on a shaft 48. The follower 47 is biased toward the cam 46 and moves upward when the raised portion of the cam reaches the contact portion of the follower 47. A push-off link 49 is mounted on shaft 48 and strips the film 17 from register pin 45 when the raised portion of the cam engages the contact surface of the follower. The raised portion of the cam extends over the entire pull-down portion of the timing cycle; thus, the sprocket holes will not be damaged during pull-down since the film is held out of contact with register pins 45. A similar push-off link 49, not shown, is located adjacent the other register pin 45, not shown, and performs the same function as that shown. Shaft 48 extends the width of the film and operates the other push-off link in the same manner as the one shown in the drawing.

Another cam 50 driven by shaft 18 controls the pull-down cycle. A cam follower 51 pivoted on a shaft 52 is urged into contact with the cam by a large spring 53. Spring 53 is held at one end by a pin 54 extending from wall 14 and at its other end by a pin 55 extending from cam follower 51. Arm 32 which supports roller 31 is also pivoted on shaft 52. A contact surface 56 engages arm 32 when the follower 51 passes the steep drop on the surface of cam 50. This causes the follower 51 and arm 32 as well as roller 31 to be accelerated in the clockwise direction to advance the film. A second, much lighter spring 58 is connected between pin 55 and another pin 59 on arm 32 and provides a properly proportional tension on film 17 via roller 31 at all times other than the pull-down time when the force exerted by spring 58 is overcome by the force exerted by spring 53.

*Operation*

The novel pull-down mechanism disclosed above differs substantially from the conventional beater type pull-down mechanism since it makes possible the employment of proper uniform film tension during the dwell or exposure period. The novel pull-down mechanism provides for the separation of the high forces required to accelerate the rollers and the film during pull-down from the comparatively light forces required to maintain the proper film tension during the dwell or exposure period. Since these functions are independent of each other, it is possible to proportion the forces so that film stretch and sprocket hole deformation will not occur during the dwell period when the film is retained against movement by the register pins 45.

The pull-down roller 31 is in reality under the influence of both springs 58 and 53. Tension providing spring 58 is attached to one side of arm 32 and anchored on its other side to pivoted cam follower 51 which is actuated by cam 50. The common fulcrum point is shaft 52 and cam 50 lifts the follower 51 at a rapid rate during the film dwell period to maintain via spring 58 an even small force on the lower film loop and a similar force on the perforations which are during this period in engagement with register pins 45. Cam 50 is coupled to cam 46 by means of shaft 18. Cam 46 controls the action of push-off plates 49 which strip the film from register pins 45 prior to pull-down.

The timing of the two cams is such that cam 46 through cam follower 47 moves push-off plates 49 forward to strip the film off the register pins 45 followed instantly by the release of cam follower 51 from its high point to its low point on cam 50. Cam follower 51 is held against cam 50 by the large force supplied by spring 53. In addition, spring 53 provides the large force necessary for a rapid pull-down. The pull-down force supplied by spring 53 is transferred through follower 51 to arm 32 via contact surface 56. Cam 50 is designed so that contact surface 56 does not engage arm 32 during any portion of the dwell period.

With the arrangement described above spring 53 may be made as heavy as necessary to accelerate not only the film but the rollers and all the associated linkages as well, to provide the short duration pull-down required and not unduly stretch or otherwise deform the sprocket holes and the film during the dwell or exposure period since the comparatively light spring 58 provides the proper film tension during the dwell period. The importance of this dual arrangement is quite apparent when one considers that the mass of tension roller 31 and its associated support system may, in most instances, be as much as 20 times the mass of the film strip which is to be advanced. Thus, if a single spring were used, the film during the dwell period would be subjected to continuously increasing forces which would, without a doubt, produce sprocket hole deformation and film stretch with resulting image distortion.

While a single embodiment only of the invention has been shown and described in detail for illustration purposes, applicant wishes it clearly understood that his invention is not limited to the specific details disclosed.

What is claimed is:

1. A film beater intermittent comprising,
a roller for continuously engaging a film loop,
a periodic timing mechanism for controlling film movement,
first spring means under the control of said periodic timing mechanism for accelerating said roller once each said period and subjecting said film loop to a predetermined movement,
and second spring means for subjecting said roller to a second smaller force during the remainder of the period to maintain the film under proper tension during the film dwell time.

2. A film beater intermittent comprising,
continuously driven sprocket rollers engaging and driving a film strip,
guide members engaging and guiding said film strip past an optical aperture,
register pins positioned on said guide members and engaging sprocket holes in said film strip for holding said film strip stationary at said optical aperture during a portion of said intermittent cycle,
a first continuously operated cam member,
a cam follower therefor positioned to be actuated during the pull-down interval of each intermittent cycle,
push-off link members having a surface engaging said film strip adjacent said register pins, said push-off link members being connected to and operated by said cam follower to move said film strip out of engagement with said register pins during the period said cam follower is actuated by said first cam member,
a second continuously operated cam member having a spirally increasing cam surface provided with an abrupt offset extending between the high and low points thereof,
a cam follower lever pivoted intermediate its ends having one end engaging the cam surface of said second cam member,
a first spring engaging the other end of said cam follower lever biasing said lever towards said second cam member,
a film beater lever having one end pivoted to said cam follower lever and the other end carrying a film beater roller which engages said film strip below said optical aperture,
a second spring having one end fixed to said film beater lever urging said film beater lever and roller in a direction to apply tension to said film strip, said first spring being of a character to exert a much greater tension force than said second spring,
and said cam follower lever being provided with an offset intermediate its ends which offset carries a contact surface overlying the upper surface of said beater lever, said contact surface engaging said beater lever in a direction to advance said film strip under the force of said first spring when said cam follower lever moves from the high to the low point of said second cam member.

3. A film beater intermittent comprising,
a pair of spaced film drive sprockets,
drive means for rotating said sprockets at a uniform constant speed to drive a film in one direction only,
film guide means located intermediate said sprockets for guiding the film driven by the sprockets,
first means located proximate the film guide for engaging the film to prevent film movement in the vicinity of the guide means,
second means for periodically disengaging the film from the first means to permit unrestricted film movement in the vicinity of the guide means,
third means for drivingly engaging the film intermediate the guide and the last sprocket in the direction of film movement,
fourth means including a first spring operated in synchronism with said second means for accelerating said third means periodically, said acceleration occurring after the second means disengages the film from the first means and terminating prior to reengagement of the film by the first means, and fifth means including a second spring of much greater compliance than said first spring for subjecting said third means to only a small force during the entire portion of the period during which the first means engages the film to maintain the film under proper tension during the film dwell time.

4. A film beater intermittent comprising, a pair of spaced film drive sprockets, drive means for rotating said sprockets at a uniform constant speed to drive a film in one direction only, film guide means located intermediate said sprockets for guiding the film driven by the sprockets, first means located proximate the film guide for engaging the film to prevent film movement in the vicinity of the guide means, second means for periodically disengaging the film from the first means to permit unrestricted film movement in the vicinity of the guide means, third means including a pivoted arm and a roller mounted on one end thereof for engaging a film loop located intermediate the guide and the last sprocket in the direction of film movement, fourth means including, a rotatable cam having a substantial spiral cam surface with a relatively sharp drop between the maximum and minimum radius of the cam operated in synchronism with the second means, a cam follower pivoted at the same position as the arm included in the third means, a spring capable of storing sufficient energy to pull-down the film connected between the end of the cam follower removed from the cam and a fixed point for urging said follower toward the cam, and a bearing surface on said follower for contacting the arm included in the third means when the follower reaches the sharp drop to accelerate the arm and roller to pull-down the film during a limited predetermined cam rotation, said acceleration occurring after the second means disengages the film from the first means and terminating prior to reengagement of the film by the first means, and fifth means including a spring substantially lighter than the spring included in said fourth means, connected between a point on the arm included in the third means, intermediate the pivot point and the roller and the cam follower included in the fourth means to place the roller included in the third means under sufficient force to maintain proper film tension during film dwell time.

References Cited by the Examiner

UNITED STATES PATENTS 3,063,611 11/62 Hourdiaux _____ 352—185 X

FOREIGN PATENTS 899,316 8/44 France.
964,319 1/50 France.
783,460 11/39 Germany.
623,018 5/49 Great Britain.
443,085 12/48 Italy.

ROBERT B. REEVES, *Primary Examiner.*

RAPHAEL M. LUPO, *Examiner.*